United States Patent Office 3,578,652
Patented May 11, 1971

3,578,652
RED PHENYLAZO NAPHTHOL DYESTUFF
Gustav E. Rast, Hamburg, and Russell I. Steiner, Williamsville, N.Y., assignors to Allied Chemical Corporation, New York, N.Y.
No Drawing. Filed Oct. 20, 1967, Ser. No. 676,741
Int. Cl. C09d 45/00, 29/16
U.S. Cl. 260—151
10 Claims

ABSTRACT OF THE DISCLOSURE

Monoazo dyestuffs are prepared by coupling a 3-diazo-6-alkoxybenzene sulfonic acid and an α-naphthol disulfonic acid and precipitating the dye, either as the free acid or as an ammonium or metal salt. The trisodium salts are preferred because of their low toxicity to warm-blooded animals. The dyestuffs are useful as colorants for foods, pharmaceuticals, cosmetics, and the like, and form aluminum lakes useful as pigments for plastics.

Certain red dyes have been used in various coloring or dyeing applications, especially in coloring foodstuffs, such as fruits. One such dyestuff, the disodium salt of 2-(5-sulfo-2,4-xylylazo)-1-naphthol-4-sulfonic acid, hereinafter referred to as F D&C Red No. 4, recently has been delisted by the United States Food and Drug Administration for essentially all edible uses, thereby creating a need for a non-toxic red dye particularly useful in coloring foodstuffs and food containers.

Accordingly, it is a principal object of the present invention to provide new and useful dye compositions.

It is another object to provide non-toxic dyestuffs which are useful in coloring edible substrates.

It is a further object to provide non-toxic dyestuffs which are useful in coloring materials used in food containers.

Further objects will become apparent from the following detailed description thereof.

The dyestuffs of the invention have the formula

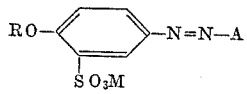

wherein R is an alkyl group of one to six carbon atoms, M is hydrogen, ammonium, or a physiologically acceptable metal cation such as sodium, potassium, barium, calcium, or iron, and A is a monovalent radical selected from the group consisting of

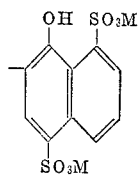

and

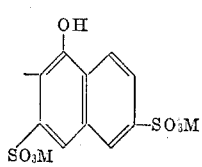

wherein M has the meaning given above. The preferred dyestuffs of the invention are those compositions corresponding to the above formulas wherein R is a methyl group and M is sodium, potassium, or ammonium because of the low toxicity of these compositions. Mixed salts, such as monosodium and monopotassium salts, as well as acid salts, are also within the scope of the present invention.

Examples of compounds included within the scope of invention are:

![structure](CH₃O—⟨⟩—N=N—⟨⟩ with OH, SO₃Na, SO₃Na, SO₃Na)

3-(4-methoxy - 3 - sodium sulfophenylazo) - 4 - hydroxy-naphthalene-1,5-disodium sulfonate;

![structure](CH₃O—⟨⟩—N=N—⟨⟩ with OH, SO₃Na, SO₃Na, S₃Na)

3-(4-methoxy - 3 - sodium sulfophenylazo) - 4 - hydroxy-naphthalene-2,7-disodium sulfonate;

![structure](CH₃O—⟨⟩—N=N—⟨⟩ with OH, SO₃K, SO₃K, SO₃K)

3-(4-methoxy - 3 - potassium sulfophenylazo)-4-hydroxy-naphthalene-1,5-dipotassium sulfonate;

![structure](CH₃O—⟨⟩—N=N—⟨⟩ with OH, SO₃NH₄, SO₃NH₄, SO₃NH₄)

3-(4-methoxy - 3 - ammonium sulfophenylazo)-4-hydroxy-naphthlene-1,5-diammonium sulfonate;

₄O—⟨⟩—N=N—⟨⟩ with OH, SO₃NH₄, SO₃NH₄, SO₃NH₄)

3-(4-pentoxy - 3 - ammonium sulfophenylazo)-4-hydroxy-naphthalene-2,7-diammonium sulfonate;

![structure](CH₃CH₂O—⟨⟩—N=N—⟨⟩ with OH, SO₃H, SO₃H, SO₃H)

3-(4-ethoxy - 3 - sulfophenylazo)-4-hydroxynaphthalene-1,5-disulfonic acid, and the like.

The dyestuffs of the present invention are soluble in water and are essentially non-toxic to warm-blooded animals. Further, 3-(4-methoxy-3-sodium sulfophenylazo)-4-hydroxynaphthalene-1,5-disodium sulfonate, one of the dyestuffs of the present invention, is stable to sulfur dioxide in aqueous solutions, is stable to hydrogen ions in aqueous solutions having a pH of 3 or higher, is stable to ascorbic acid in concentrations ranging from about 50 to about 100 p.p.m., and is stable at temperatures encountered in baking operations, such as 175° C. for periods of twenty-five minutes and longer. When used to color soft drinks, both carbonated and non-carbonated, the dyestuff compositions of the invention are essentially noncorrosive to beverage containers, both lined and unlined, for periods of at least six months. The novel dyestuffs of the invention also possess excellent light stability in a variety of substrates.

The novel dyestuffs described herein can be converted by known procedures into non-toxic aluminum lakes. In this form they are excellent pigments for plastics such as polyethylene, polypropylene, polyamides and others which are widely used in the form of films and molded articles as wrappings, and containers for edible substrates such as fodstuffs, pharmaceutical products, cosmetics, and the like.

These characteristics of the monoazo dyestuffs of the invention are indicative of their suitability as colorants for edible substrates such as fruits, sugar paties, hard candies, gelatin desserts, beverages, and cake and cookie mixes, as well as for food containers, wrappers, labels, etc., which may come in contact with edible substrates. These characteristics as well as their extremely low toxicity to warm-blooded animals, as determined by standard tests with rats by both acute and chronic feeding tests, indicate their value as an addition to the list of dyestuffs certifiable by the United States Food and Drug Administration. For example, chronic feeding tests involving additions of up to 5 percent of trisodium salts of the methoxy-substituted compounds of the invention to the normal rations of test animals did not change their growth rate or food consumption significantly compared with an animal control group studied simultaneously.

The dyestuffs of the present invention can be prepared in conventional manner by a coupling reaction between a 3-diazo-6-alkoxybenzene sulfonic acid and an α-naphthol disulfonic acid in alkaline solution. In accordance with a preferred mode of preparing the above-described compounds, a 3-amino-6-alkoxybenzene sulfonic acid is diazotized by forming a slurry in warm water and dissolving the amine by adding sufficient alkali so that the solution has a pH of 7.1 or higher. Any insoluble material is filtered off and the solution is strongly acidified with a mineral acid such as hydrochloric acid. The solution is then cooled to about 0° C. in ice and sodium nitrite added. The mixture is stirred for about one hour or longer in the cold. The resulting diazonium salt solution is added to a cooled solution containing an excess of the desired α-naphtholdisulfonic acid and sufficient alkali so that the resultant coupling mixture is alkaline. The trisodium salt is obtained by heating the solution to about 80–90° C., salting out e.g., with sodium chloride and filtering the product. The product can be purified further if desired by dissolving it in hot water and reprecipitating from solution.

The monoazo dyestuffs of the invention are generally isolated in the form of their trisodium salts, but other physiologically acceptable salts corresponding to the general formula as described herein can also be prepared by known procedures. For example, the corresponding tripotassium salt can be obtained by acidifying the alkaline coupling mixture with a mineral acid, such as hydrochloric acid, sulfuric acid, or nitric acid, and potassium hydroxide added to cause precipitation of the desired salt; similarly, ammonium hydroxide can be substituted for potassium hydroxide to obtain the corresponding triammonium salt. Other physiologically acceptable salts can be prepared by adding a soluble salt, for example calcium chloride, barium chloride, ferrous sulfate, and the like, to the alkaline coupling mixture to form the corresponding calcium, barium, or ferrous salts. The free acids can be obtained by neutralizing the alkaline coupling mixture with a mineral acid and precipitating the product by cooling. Isolation of the free acids can be effected by extracting the product with a water immiscible organic solvent for the product, such as diethylether, ethyl acetate, and the like and thereafter evaporating the solvent.

The dyestuffs of the invention form non-toxic lakes with aluminum. The term "lake" is applied to an intimate mixture of aluminum hydrate and the organic pigment, which can be prepared in conventional manner by slurrying the pigment in a solution of a soluble aluminum salt, such as aluminum chloride or aluminum sulfate or mixing a solution of the pigment with an aluminum solution. The lake is precipitated by careful neutralization with an alkali such as sodium carbonate, filtered and dried. In this form the dyestuffs of the invention are particularly suited as pigments for coloring plastics, including both thermoplastic resins such as polystyrene, polymethyl methacrylate, polyvinyl chloride, and copolymers thereof, polyethylene, polypropylene, polyamides such as polycaproamide, fluorohydrocarbon polymers, cellulosic esters and ethers and the like used in the form of wrapping film, containers, etc. and thermosetting resins such as silicones, melamine urea, melamine formaldehyde and the like used in molding and extrusion processes to form containers for foods, pharmaceuticals, cosmetics, playthings, and other materials intended for consumption by or application to warm blooded animals.

The amount of colorant which can be incorporated into the resin or monomer thereof, can vary over a wide range. The particular amount used will depend upon the depth of the shade desired. Thus light or pastel shades can be obtained with amounts of aluminum lake as low as 0.001 part of aluminum lake per 100 parts of resin. Deeper shades are obtained using from about 0.002 to 20.0 parts or more of aluminum lake per 100 parts of resin. Deeply colored resins can be used as master batches, comminuted after coloration and admixed with the desired amount of unpigmented resin. This mixture can then be processed in known manner to give lighter shades. Thus the aluminum lakes of the invention can be added in minute amounts up to relatively large amounts depending upon the shade desired, limited only to the amount of pigment compatible with the resin being colored. The aluminum lakes of the invention can be added along with other ingredients, including inorganic pigments, such as titanium dioxide, heat and light stabilizers, plasticizers, etc. as will be known to one skilled in the art.

The pigments of the invention can be incorporated into a resin in known manner, as by milling, in accordance with the established processing techniques utilized for the particular resin to be colored.

The term "edible substrate" as used in this specification and in the claims appended hereto is intended to include a wide variety of food, pharmaceutical, and cosmetic compositions, either in liquid or solid form, which can be colored with the dyestuffs of the invention. The term is also meant to include containers, wrappings, inks, and the like colored with these dyestuffs and which can come into contact with edible materials contained or enclosed therein.

The addition of the dyestuffs of the invention as colorants for edible substrates is effected by methods well known to the art, for example by methods conventionally used with F D&C Red. No. 4, and thus detailed discussion of this collateral aspect of our invention is deemed unnecessary.

The preparation of the dyestuffs of our invention and methods of using them will be further illustrated by the following examples, but it is to be understood that the invention is not meant to be limited to the details disclosed therein. In the examples, parts and percentages are by weight unless otherwise noted.

EXAMPLE 1

505 parts of 86 percent 3-amino-6-methoxybenzene sulfonic acid were slurried in 3000 parts of warm water (55°–60° C.) and 175 parts of 50° Bé. aqueous sodium hydroxide were added. The mixture was stirred while an additional 172.5 parts of the hydroxide were added so that the final mixture was alkaline to Nitrazine Yellow indicator. The resultant solution was clarified by adding decolorizing charcoal and 10 parts of "Solka-Floc" (a registered trademark of the Brown Co. for a chemically purified wood-cellulose in floc form) and filtering off the insoluble material. The solution was neutralized with 608 parts of 20° Bé hydrochloric acid and cooled in ice. 142 parts of sodium nitrite as a 30% aqueous solution were added over about forty-five minutes and stirred for an hour at 5–8° C.

In a separate vessel 638.5 parts of 4-hydroxynaphthalene-1,5-disulfonic acid were slurried in 4000 parts of warm water and made alkaline to Brilliant Yellow indicator with 9 parts of sodium hydroxide. The solution was decanted from the insoluble material. 420 parts of sodium carbonate as a 20% solution were added to the solution and the mixture cooled below 10° C. with ice.

The two solutions were combined over a one-hour period, adding the diazo solution to the alkaline coupling solution, stirred an hour longer, and heated to 85° C. 900 parts of lime-free sodium chloride were added, and the mass was stirred for sixteen hours while allowing the mixture to cool to room temperature.

The product was recovered by filtration.

The solid product obtained by combining two lots of the product prepared as above was purified by heating a slurry in about 20,000 parts of water to dissolve the product at 90° C. 95.5 parts of anhydrous disodium phosphate and 120 parts of decolorizing charcoal were added, stirred for one hour, 150 parts of filter aid added, and the mixture was filtered. The filtrate was stirred for about sixteen hours and cooled to room temperature. The resultant slurry was filtered and dried at 70–75° C.

The product was 3-(4-methoxy-3 sodium sulfophenylazo)-4-hydroxynaphthalene-1,5-disodium sulfonate which has the formula

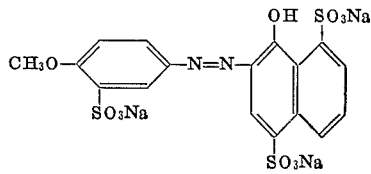

EXAMPLE 2

406.4 parts of 3-amino - 6 - methoxybenzene sulfonic acid were slurried in 2000 parts of water at 56–60° C. and 175 parts of 50° Bé aqueous sodium hydroxide added. An additional 172.5 parts of the hydroxide were added until the solution became alkaline to Nitrazine Yellow. 580 parts of 20° Bé. hydrochloric acid were added and the mixture cooled to 0° C. in ice. 142 parts of sodium nitrite as a 30% aqueous solution were added dropwise and the mixture stirred at 5–7° C. for one hour.

In a separate vessel 895 parts of 68% 4-hydroxynaphthalene - 2,7-disodium sulfonate were slurried in 2000 parts of warm water. 10 parts of sodium carbonate were added as a 20% aqueous solution to render the mixture alkaline to Nitrazine Yellow. The mixture was diluted with 2000 parts of water and 2100 parts of a 20% aqueous sodium carbonate solution.

The two solutions were combined over a one-hour period, adding the diazo solution to the alkaline naphthol solution, stirred for one hour, and heated to 75° C. 1000 parts of lime-free sodium chloride were added and the mixture cooled to room temperature while stirring. The resultant slurry was filtered.

The solid product was purified as in Example 1. It was 3-(4-methoxy-3-sodium sulfophenylazo)-4-hydroxynaphthalene-2,7-disodium sulfonate, having the formula

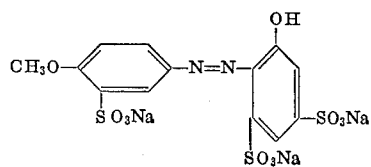

EXAMPLE 3

Cherries which had been bleached with aqueous sulfur dioxide and washed with water until free of sulfur dioxide were placed in a 10% sugar syrup containing 0.04% of 3-(4-methoxy-3-sodium sulfophenylazo)-4-hydroxynaphthalene-1,5-disodium sulfonate for thirty minutes at 180° F. The cherries were removed from the dye solution and after standing for about 16 hours were washed with cold water. They were then stored in light sugar syrup containing 200 p.p.m. of sulfur dioxide for two months and compared with cherries which had been similarly dyed and stored substituting F D&C Red No. 4 as the dye.

The cherries were very close in shade, those dyed with the dyestuff of the invention being slightly bluer than those dyed with F D&C Red No. 4.

EXAMPLE 4

A flask containing an 0.03% solution of the dyestuff prepared as in Example 1 and 400 p.p.m. of sulfur dioxide was stoppered and stored in the dark for sixteen days. A comparison was made between this sample and another solution which did not contain sulfur dioxide, using a Biocolorimeter. The solution retained about 92% of its original color strength. F D&C Red No. 4 dye retained about 93% of its original color strength when when tested under the same conditions.

This experiment demonstrates that the dyestuffs of the invention have acceptable stability to sulfur dioxide and are suitable for replacing F D&C Red No. 4 as a colorant for maraschino cherries.

EXAMPLE 5

5.64 parts of 3-(4-methoxy-3-sodium sulfophenylazo)-4-hydroxynaphthalene-1,5-disodium sulfonate as prepared in Example 1 in 225 parts of warm water were added to a slurry of 30 parts of aluminum hydroxide in 1000 parts of water and stirred for fifteen to twenty minutes. 21.5 parts by volume of a 20% aqueous aluminum chloride solution were added, stirred for two hours, and filtered. The resultant aluminum lake was washed with 600 parts of water and dried at 70° C. for sixteen hours. 38.2 parts of the dried lake were finely ground and contained about 14% of coal tar dye.

EXAMPLE 6

50 parts of polyethylene (compound DYNH sold by Bakelite Corporation) which had been preheated at 194° F. for one hour were milled on a steam-heated differential two-roll mill wherein the front roll was heated at 210° F. and the rear roll was unheated, until the material adhered completely. 0.05 parts (100%) of coal tar dye basis) of the pigment prepared in Example 5 was added and milling continued for seven minutes. The resultant colored resin was removed as a sheet and cooled. A strip of the resin 2 x 5 inches in size was placed between polished plates and heated in a press at 220° F. and 2000 p.s.i. pressure. The pressure was cooled with water to room temperature and the film removed.

The colored polyethylene film was transparent and had a stronger color by both transmitted and reflected light than a polyethylene film similarly prepared and colored using the aluminum lake of F D&C Red No. 4 as pigment.

An opaque polyethylene film was prepared as above except that 1% of titanium dioxide was added with the pigment. Again, the dyestuff of the invention had a stronger color than a similarly prepared film using the aluminum lake of F D&C Red No. 4 as the pigment.

It can be seen from the above that we have provided valuable and desirable monoazo dyestuffs, aluminum lakes thereof and edible substrates colored therewith which are non-toxic to warm-blooded animals.

It is apparent that numerous modifications and variations may be effected without departing from the novel

We claim:
1. A red monoazo dyestuff having the formula

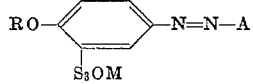

wherein R is an alkyl group having from 1 to 6 carbon atoms, M is hydrogen, ammonium or a physiologically acceptable metal cation, and A is a monovalent radical selected from the group consisting of

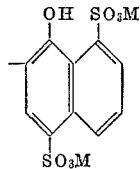

and

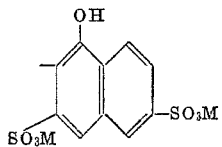

wherein M independently at each occurrence has the above-defined meaning.

2. The dyestuff of claim 1 wherein R is a methyl group.
3. The dyestuff of claim 1 wherein M at each occurrence is hydrogen.
4. The dyestuff of claim 1 wherein M at each occurrence is ammonium.
5. The dyestuff of claim 1 wherein M is a metal selected from the group consisting of sodium, potassium, barium, calcium and iron.
6. The dyestuff of claim 1 wherein M at each occurrence is sodium.
7. The dyestuff of claim 1 wherein M at each occurrence is potassium.
8. The dyestuff of claim 1 wherein R is a methyl group, M at each occurrence is sodium and A is a radical of the formula

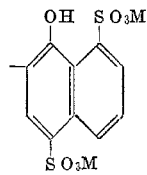

9. The dyestuff of claim 1 wherein R is a methyl group, M at each occurrence is sodium and A is a radical of the formula

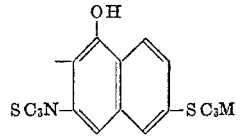

10. The aluminum lake of a dyestuff of claim 1.

References Cited
UNITED STATES PATENTS
2,053,394  9/1936  Delfs _____ 260—200X

CHARLES B. PARKER, Primary Examiner
D. M. PAPUGA, Assistant Examiner

U.S. Cl. X.R.
99—103, 147, 171; 106—288; 117—138.8; 260—37, 41, 42, 209; 424—358

PO-1050
(5/69)

UNITED STATES PATENT OFFICE
CERTIFICATE OF CORRECTION

Patent No. 3,578,652          Dated May 11, 1971

Inventor(s) Gustav E. Rast and Russell I. Steiner

It is certified that error appears in the above-identified patent and that said Letters Patent are hereby corrected as shown below:

Column 2, 2nd formula, formulation to far right which reads $S_3Na$ should read --$SO_3Na$--.

Column 3, line 12, the word "fodstuffs" should be --foodstuffs--.

Column 3, line 16, the word "paties" should be --patties--.

Column 4, line 25, the word "obtined" should be --obtained--.

Column 6, line 26, delete the word "when".

Column 6, line 58, the word "pressure", second occurrence, should be -- press --.

Claim 1, in the formula, the formula at the lower left which reads $S3OM$ should read --$SO_3M$--.

Claim 9, in the formula, the formula on the lower left which reads "$SC_3N$ should read --$SO_3M$--; the formula on the lower right which reads "$SC_3M$" should read --$SO_3M$--.

Signed and sealed this 6th day of June 1972.

(SEAL)
Attest:

EDWARD M. FLETCHER, JR.
Attesting Officer

ROBERT GOTTSCHALK
Commissioner of Patents